(12) United States Patent
Desappan et al.

(10) Patent No.: US 9,747,515 B2
(45) Date of Patent: Aug. 29, 2017

(54) EFFICIENT FEATURE POINT SELECTION

(71) Applicant: TEXAS INSTRUMENTS INCORPORATED, Dallas, TX (US)

(72) Inventors: Kumar Desappan, C.V. Raman (IN); Prashanth R. Viswanath, Bangalore (IN); Pramod Kumar Swami, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 13 days.

(21) Appl. No.: 14/794,916

(22) Filed: Jul. 9, 2015

(65) Prior Publication Data

US 2016/0117569 A1   Apr. 28, 2016

(30) Foreign Application Priority Data

Oct. 22, 2014 (IN) .......................... 5271/CHE/2014

(51) Int. Cl.
| | |
|---|---|
| *G06K 9/46* | (2006.01) |
| *G06T 9/20* | (2006.01) |
| *G06K 9/00* | (2006.01) |
| *G06T 7/73* | (2017.01) |

(52) U.S. Cl.
CPC ....... *G06K 9/4671* (2013.01); *G06K 9/00973* (2013.01); *G06T 7/73* (2017.01); *G06T 9/20* (2013.01); *G06T 2207/10004* (2013.01); *G06T 2207/20164* (2013.01)

(58) Field of Classification Search
None
See application file for complete search history.

(56) References Cited

U.S. PATENT DOCUMENTS

| 2013/0089261 A1* | 4/2013 | Sung | G06K 9/4604 382/199 |
| 2013/0322761 A1* | 12/2013 | Zeng | G06K 9/4638 382/195 |

* cited by examiner

*Primary Examiner* — Sumati Lefkowitz
*Assistant Examiner* — David Perlman
(74) *Attorney, Agent, or Firm* — Gregory J. Albin; Charles A. Brill; Frank D. Cimino

(57) ABSTRACT

Systems and methods are provided for selecting feature points within an image. A plurality of candidate feature points are identified in the image. A plurality of feature points are selected for each of the plurality of candidate feature points, a plurality of sets of representative pixels. For each set of representative pixels, a representative value is determined as one of a maximum chromaticity value and a minimum chromaticity value from the set of representative pixels. A score is determined for each candidate feature point from the representative values for the plurality of sets of representative pixels associated with the candidate feature point. The feature points are selected according to the determined scores for the plurality of candidate feature points.

26 Claims, 2 Drawing Sheets

EFFICIENT FEATURE POINT SELECTION

RELATED APPLICATIONS

This application claims priority to Indian Provisional Patent Application No. 5271/CHE/2014, filed Oct. 22, 2014, the entire contents of which are incorporated by reference.

BACKGROUND OF THE INVENTION

Field of the Invention

The invention relates generally to image detection, and more specifically, to the selection of feature points within images.

Background of the Invention

In computer vision and image processing the concept of feature detection refers to methods that aim at computing abstractions of image information and making local decisions whether there is an image feature of a given type. The resulting features will be subsets of the image domain, often in the form of isolated points, continuous curves or connected regions. There is no universal or exact definition of what constitutes a feature, and the exact definition often depends on the problem or the type of application. A feature is effectively defined as an "interesting" part of an image, and features are used as a starting point for many computer vision algorithms. Since features are used as the starting point and main primitives for subsequent algorithms, the overall algorithm will often only be as good as its feature detector. Consequently, the desirable property for a feature detector is repeatability, that is, whether or not the same feature will be detected in two or more different images of the same scene.

SUMMARY OF THE INVENTION

In accordance with one example of the present invention, a method is provided for selecting feature points within an image. A plurality of candidate feature points are identified in the image. A plurality of feature points are selected for each of the plurality of candidate feature points, a plurality of sets of representative pixels. For each set of representative pixels, a representative value is determined as one of a maximum chromaticity value and a minimum chromaticity value from the set of representative pixels. A score is determined for each candidate feature point from the representative values for the plurality of sets of representative pixels associated with the candidate feature point. The feature points are selected according to the determined scores for the plurality of candidate feature points In accordance with another example of the present invention, a system is provided for selecting feature points from a plurality of candidate feature points. The system includes a single instruction, multiple data (SIMD) processor and at least one non-transitory computer readable medium operatively connected to the SIMD processor and storing machine executable instructions. The machine executable instructions include a pixel selection module configured to select a plurality of sets of representative pixels for each of a plurality of candidate feature points and a score assignment module configured to determine one of a maximum chromaticity value and a minimum chromaticity value from each set of representative pixels as a representative value and determine a score for each candidate feature point from the representative values for the plurality of sets of representative pixels associated with the candidate feature point. A feature point selection module is configured to select a set of P feature points from the plurality of candidate feature points according to the determined scores for the plurality of candidate feature points.

In accordance with yet another example of the present invention, a system is provided for selecting feature points from a plurality of candidate feature points. The system includes a single instruction, multiple data (SIMD) processor and at least one non-transitory computer readable medium operatively connected to the SIMD processor and storing machine executable instructions. The machine executable instructions include a pixel selection module configured to instruct the SIMD processor to load respective arrays of pixels in respective regions of interest around a set of M candidate feature points into a first array, where M is an integer greater than one, and generate a second array, containing only pixels from selected sets of representative pixels for the M candidate feature points, using a parallel SIMD look-up instruction. A score assignment module is configured to determine one of a maximum chromaticity value and a minimum chromaticity value from the each set of representative pixels as a representative value and determine a score for each candidate feature point from the representative values for the plurality of sets of representative pixels associated with the candidate feature point. A feature point selection module is configured to select a set of P feature points from the plurality of candidate feature points according to the determined scores for the plurality of candidate feature points.

BRIEF DESCRIPTION OF THE DRAWINGS

The features, objects, and advantages of the invention will become more apparent from the detailed description set forth below when taken in conjunction with the drawings, wherein.

DETAILED DESCRIPTION OF THE INVENTION

Features from accelerated segment test (FAST) is a feature detection method, which could be used to extract feature points and later used to track and map objects in many computer vision tasks. FAST corner detector is very suitable for real-time video processing application because of high-speed performance. FAST corner detector uses a circle of sixteen pixels, specifically a Bresenham circle of radius three, to classify whether a candidate point p is actually a feature. If a set of N contiguous pixels in the circle are either all brighter than the intensity of candidate pixel, p, plus a threshold value, t, or all darker than the intensity of candidate pixel minus the threshold value, then the candidate pixel is classified as a feature. While FAST can be an efficient means for selecting feature points, the inventors have determined that the iterative nature of the score assignment process can result in inefficiencies during certain types of parallel processing, particularly in single instruction, multiple data (SIMD) processors.

Figure 1:
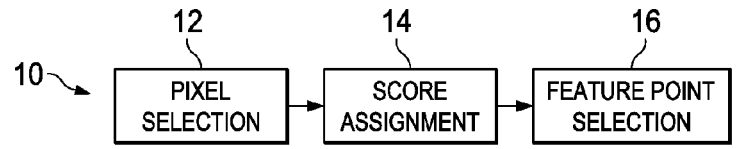
FIG. 1 illustrates a system for ranking candidate feature points in an image.

FIG. 1 illustrates one example a system 10 for selecting among a plurality of candidate feature points. Each of the functional blocks 12, 14, and 16 within the illustrated system 10 can be implemented, for example, as dedicated hardware, software instructions executed by an associated processor, or a combination of dedicated hardware and software components. A pixel selection module 12 is configured to select a plurality of sets of representative pixels for each of the plurality of candidate feature points. It will be appreciated that the specific feature points selected will vary according to a desired feature detection modality (e.g., corner detection, edge detection, ridge detection, or region of interest ("blob") detection). In the illustrated implementation, the pixel selection module 12 defines a Bresenham circle of radius three around the selected feature point. It will be appreciated that, where the candidate feature points are selected via a FAST process, the Bresenham circle for each candidate feature point may be retained from this initial process. The selected sets of representative pixels are then selected as all possible series of N contiguous pixels around the circle, where N is an integer greater than two. N can take on any integer value between three and fifteen, with some specific implementations using values of nine or twelve.

A score assignment module 14 is configured to determine one of a maximum chromaticity value and a minimum chromaticity value from the each set of representative pixels as a representative value and determine a score for each candidate feature point from the representative values for the plurality of sets of representative pixels associated with the candidate feature point. It will be appreciated that a chromaticity value can be any value representing the hue, saturation, or brightness of a given pixel, for example, a brightness value or a color component in an RGB or YCbCr color model. Essentially, the score assignment module 14 determines a score representing the distinctiveness of the feature point. In the example implementation discussed previously, the score for each feature point represents the highest threshold for a FAST process that would still include that feature point. To this end, the maximum or minimum values for the sets of representative pixels can represent the "weak link" in the chain of contiguous pixels, that is, the lowest value in a series of pixels having higher chromaticity values than the pixel representing the feature point, or the highest value in a series of pixels having lower chromaticity values than the pixel representing the feature point. The score for a given feature point can then be determined as a difference between the chromaticity value of the pixel representing the feature point and either the lowest maximum value or the highest minimum value from the sets of representative pixels.

A feature point selection module 16 is configured to select a set of feature points from the plurality of candidate feature points according to the determined scores for the plurality of candidate feature points. In one implementation, all points having a score meeting a threshold value or falling within a predetermined contiguous or noncontiguous range can be selected. Alternatively, a set of P best feature points can be selected, where P is a positive integer. The nature of the "best" feature points will vary with the score calculation, but criteria can include the minimum scores, the maximum scores, or the scores closest to or farthest from a predetermined value. In the example implementation discussed previously, a set of maximum scores are selected.

The illustrated system 10 provides a number of advantages. To being with, the system can calculate the score for each candidate feature point in single iteration. Accordingly, the time required to compute the score can be significantly reduced over previous approaches. Further, the score computation flow does not depend on the input data format, and thus the time required to find the score for each feature point will be always deterministic. It is also compatible with SIMD processing, as each feature point is processed with an identical control flow.

Figure 2:
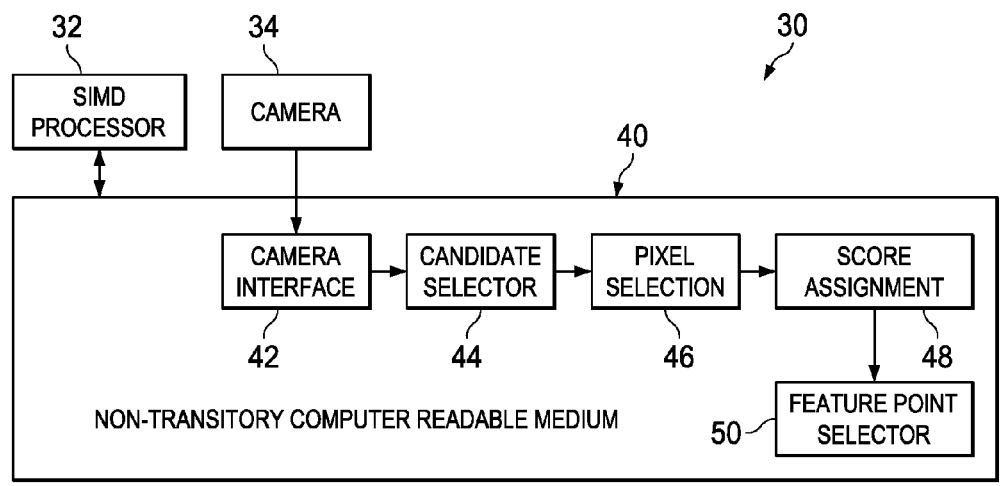
FIG. 2 illustrates one example of a system for locating feature points within an image.

FIG. 2 illustrates one example of a system 30 for locating feature points within an image. The illustrated system 30 includes a single instruction, multiple data (SIMD) processor 32, at least one camera 34, and at least one non-transitory computer readable medium 40 operatively connected to the SIMD processor and storing machine executable instructions. It will be appreciated that, instead of being provided to the non-transitory medium directly from the camera 34, the image data can be stored, in raw or processed form, and provided to the medium after a delay.

In the illustrated implementation, image data from the camera 34 is provided to the medium 40 and processed via a camera interface 42 configured to receive the image data and conditions it for further analysis. A candidate feature point 44 selector is configured to identify a plurality of candidate feature points from the image. It will be appreciated that any appropriate algorithm can be employed for this purpose, but in the illustrated implementation, the candidate feature points are determined via a features from accelerated segment test (FAST) key point detection process with a predetermined threshold value. The value for the threshold will vary with the implementation.

A pixel selection module 46 is configured to select a plurality of sets of representative pixels for each of a plurality of candidate feature points. To optimize the use of the SIMD processor 32, the pixel selection module 46 can place pixels in parallel arrays in which pixels having corresponding positions relative to the candidate feature point have the same indices. In the illustrated implementation, this could be a two stage process, in which the pixels are retrieved in a format that is generally efficient (e.g., as rows of eight contiguous pixels) and pixels of interest are retrieved in parallel using the SIMD lookup function. For example, the pixel selection module 46 can instruct the SIMD processor to load respective arrays of pixels in respective regions of interest around a set of M candidate feature points into a first array, where M is an integer greater than one, and generate a second array, containing only pixels from the sets of representative pixels for the M candidate feature points, using a parallel SIMD look-up instruction. In the illustrated implementation, a sixty-four pixel array is extracted around each feature point and the pixels, and the point of interest, along with sixteen points making up a Bresenham circle of radius three are extracted from the sixty-four pixel array. A data transpose feature available with the SIMD processor can be used to arrange the seventeen pixels in a manner desirable for processing.

In the illustrated implementation, the pixel selection module 46 is further configured to select the sets of representative pixels as a set of N contiguous pixels along the Bresenham circle including the pixel, where N is an integer greater than two, such that the plurality of sets of representative pixels represent each possible combination of N continuous pixels in the Bresenham circle. These sets of representative pixels represent each possible arc of pixels that could allow the candidate feature point to be a valid FAST feature point. Regardless of the mode of selection, the selected sets of representative pixels are evaluated at a score assignment module 48.

The score assignment module 48 is configured to determine one of a maximum chromaticity value and a minimum chromaticity value from each set of representative pixels as a representative value and determine a score for each candidate feature point from the representative values for the plurality of sets of representative pixels associated with the candidate feature point. In the example implementation, each of a minimum and a maximum value are selected for each set of representative pixels to provide sets of minimum values and maximum values. The score can then be determined by selecting the maximum value of the set of minimum values and the minimum value of the set of maximum values, and calculating the score as a value one less than the larger of the absolute difference between the value of the pixel associated with the candidate feature point and the minimum maximum value and the absolute difference between the value of the pixel associated with the candidate feature point and the maximum minimum value. It will be appreciated that the determined score represents the largest threshold value for a FAST analysis that would return the candidate feature point as a valid feature point. Effectively, a difference between the candidate feature point pixel value and the determined minimum value is selected as the score for the candidate feature point if the determined minimum value exceeds a chromaticity value associated with the candidate feature point, and a difference between the candidate feature point pixel value and the determined maximum value is selected as the score for the candidate feature point if the determined maximum value is less than the chromaticity value associated with the candidate feature point.

A feature point selection module 50 is configured to select a set of feature points from the plurality of candidate feature points according to the determined scores for the plurality of candidate feature points. In one implementation, all points having a score meeting a threshold value or falling within a predetermined contiguous or noncontiguous range can be selected. Alternatively, a set of feature points can be selected, where P is a positive integer. The selected points can have the P minimum scores, the P maximum scores, or the P scores closest to or farthest from a predetermined value. In the example implementation discussed previously, a set of maximum scores are selected. The selected feature points are then provided to either or both of a user and an associated image analysis system (not shown).

Figure 3:
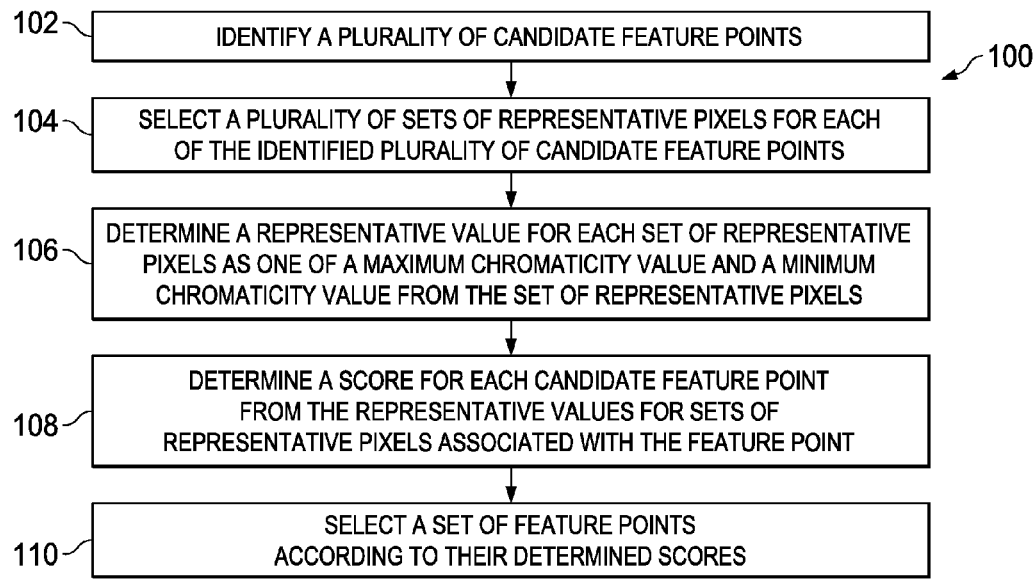
FIG. 3 illustrates a method for selecting feature points within an image.
Figure 4:
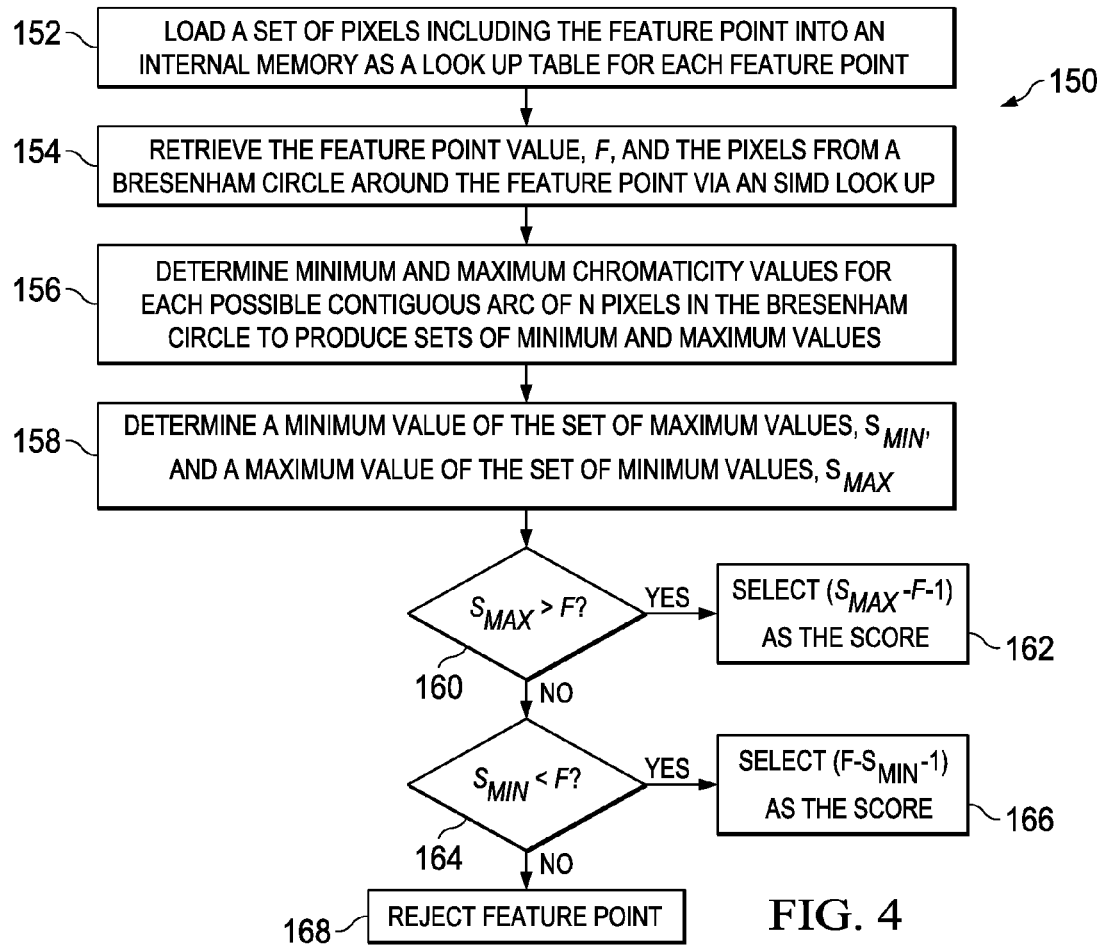
FIG. 4 illustrates one example of a method for calculating FAST scores for a plurality of feature points on a single instruction, multiple data (SIMD) processor.

In view of the foregoing structural and functional features described above, methods in accordance with various aspects of the present invention will be better appreciated with reference to FIGS. 3 and 4. While, for purposes of simplicity of explanation, the methods of FIGS. 3 and 4 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a method in accordance with an aspect the present invention.

FIG. 3 illustrates a method 100 for selecting feature points within an image. At 102, a plurality of candidate feature points in the image are identified. In one implementation, this includes applying a features from accelerated segment test (FAST) key point detection process to each image with a predetermined threshold value. At 104, a plurality of sets of representative pixels are selected for each of the identified plurality of candidate feature points. In one example, the sets of representative pixels represent contiguous arcs of pixels around the candidate pixel, that is the pixel associated with the candidate feature point. At 106, a representative value for each set of representative pixels is determined as one of a maximum chromaticity value and a minimum chromaticity value from the set of representative pixels. In one example, this can include determining a representative value for each of the plurality of representative pixels comprises determining a maximum and a minimum value chromaticity value for each of the plurality of sets of representative pixels to form a set of maximum values and a set of minimum values.

At 108, a score is determined for each candidate feature point from the representative values for the plurality of sets of representative pixels associated with the candidate feature point. Continuing the earlier example, the score can be determined by determining a minimum value from the set of maximum values, determining a maximum value from the set of minimum values, selecting one less than an absolute difference between the determined minimum value and the value of the candidate pixel as the score for the candidate feature point if the determined minimum value exceeds a chromaticity value associated with the candidate feature point, and selecting one less than an absolute difference between the determined maximum value and the value of the candidate pixel as the score for the candidate feature point if the determined maximum value is less than the chromaticity value associated with the candidate feature point. The feature points are selected according to the determined scores for the plurality of candidate feature points at 110 and provided to either or both of a user and an associated image processing system.

FIG. 4 illustrates one example of a method 150 for calculating FAST scores for a plurality of feature points on a single instruction, multiple data (SIMD) processor. It will be appreciated that the plurality of candidate feature points can be less than all of the candidate feature points considered in a given operation and can instead represent a number of lanes associated with SIMD processor. At 152, for each candidate feature point, a set of pixels that includes the feature point is loaded into an internal memory and stored in a look up table. A data transpose feature can be used to arrange the data in the look up table. In the illustrated method, the set of pixels for each feature point is a set of eight rows of eight pixels that includes a radius three Bresenham circle around the feature point. At 154, a SIMD look up operation is used to retrieve the pixels from the Bresenham circle and the feature point from the look up table.

It will be appreciated that steps 156-168 are performed in parallel for each of the plurality of feature points by the SIMD processor. At 156, for each possible contiguous arc of N pixels in the Bresenham circle, where N is an integer greater than two, a minimum chromaticity value and a maximum chromaticity value are calculated to produce a set of minimum values and a set of maximum values. At 158, a minimum value of the set of maximum values, $S_{min}$, and a maximum value of the set of minimum values, $S_{max}$, is determined. At 160, it is determined if $S_{max}$ is greater than a value of the feature point, F. If so (Y), the method terminates at 162, where $S_{max}-F-1$ is selected as the score for the candidate feature point. If not (N), the method advances to 164, where it is determined if $S_{min}$ is less than the value of the feature point. If $S_{min}$ is less than the value of the feature point (Y), the method terminates at 166, where $F-S_{min}-1$ is selected as the score for the candidate feature point. If not (N), the method terminates at 168, and the candidate feature point is rejected as invalid. Table 1 contains pseudocode representing the method of FIG. 4.

TABLE 1

```
//p = center pixel values, co : array containing 16 neighboring pixels,
// N length of the arc in number of pixels (normally 9 or 12)
Short int FAST_score_compute(unsigned char P, unsigned char* co,
unsigned char N)
{
    for(startpos=0; startpos<16; startpos++){
    pMin = co[startpos];
    pMax = co[startpos];
    for(i=1; i<N ; i++)
    {
        co_pixel = co[(startpos+i)%16];
        if(pMax < co_pixel) pMax = co_Pixel;
        if(pMin > co_pixel) pMin = co_pixel;
    }
    arc_maximum[startpos] = pMax;
    arc_minimum[startpos] = pMin;
    }
    score_b = arc_maximum[0];
    score_d = arc_minimum[0];
    for(i=1; i<16; i++){
    if(arc_maximum[i] < score_b) score_b = arc_maximum[i];//
    finding smallest in arc_maximum
    if(arc_minimum[i] > score_d) score_d = arc_minimum[i]; //
    finding largest in arc_minimum
    }
    if(score_d > p) score = score_d – p– 1;
    else if (score_b < p) score = p– score_b – 1
    else score = –1; // Not a valid key Point
    }
    return score;
```

Figure 5:
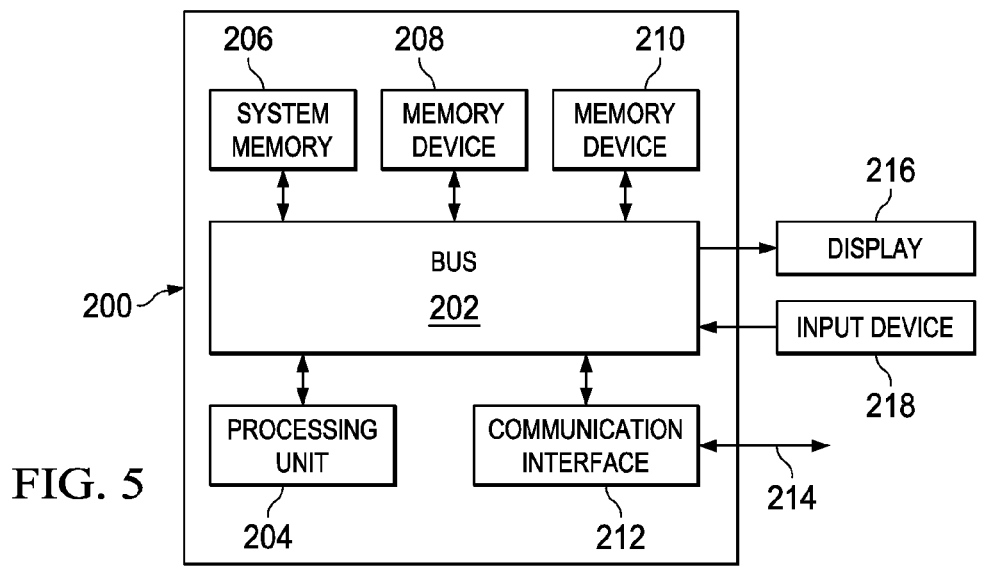
FIG. 5 illustrates a schematic block diagram illustrating an exemplary system of hardware components capable of implementing examples of the systems and methods disclosed in FIGS. 1-4.

FIG. 5 is a schematic block diagram illustrating an exemplary system 200 of hardware components capable of implementing examples of the systems and methods disclosed in FIGS. 1-4. The system 200 can include various systems and subsystems. The system 200 can be a personal computer, a laptop computer, a workstation, a computer system, an appliance, an application-specific integrated circuit (ASIC), a server, a server blade center, a server farm, etc.

The system 200 can includes a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard and/or a mouse). The system bus 202 can be in communication with the processing unit 204 and the system memory 206. The additional memory devices 208 and 210, such as a hard disk drive, server, stand-alone database, or other non-volatile memory, can also be in communication with the system bus 202. The system bus 202 interconnects the processing unit 204, the memory devices 206-210, the communication interface 212, the display 216, and the input device 218. In some examples, the system bus 202 also interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processing core.

The additional memory devices 206, 208 and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio, portions of which can be available in formats comprehensible to human beings.

Additionally or alternatively, the system 200 can access an external data source or query source through the communication interface 212, which can communicate with the system bus 202 and the communication link 214.

In operation, the system 200 can be used to implement one or more parts of a feature point selection system in accordance with the present invention. Computer executable logic for implementing the system resides on one or more of the system memory 206, and the memory devices 208, 210 in accordance with certain examples. The processing unit 204 executes one or more computer executable instructions originating from the system memory 206 and the memory devices 208 and 210. The term "computer readable medium" as used herein refers to a medium that participates in providing instructions to the processing unit 204 for execution, and can include either a single medium or multiple non-transitory media operatively connected to the processing unit 204.

The invention has been disclosed illustratively. Accordingly, the terminology employed throughout the disclosure should be read in an exemplary rather than a limiting manner. Although minor modifications of the invention will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

Having described the invention, we claim:

1. A method for selecting feature points within an image, comprising:

identifying a plurality of candidate feature points in the image;

selecting, for each of the plurality of candidate feature points, a group of pixels around a pixel associated with the candidate feature point, the group of pixels forming a Bresenham circle having a radius of at least two;

selecting, for each of the plurality of candidate feature points, a plurality of sets of representative pixels from the group of pixels, each of the sets of representative pixels being selected as a respective set of N contiguous pixels along the Bresenham circle, where N is an integer greater than two, such that the sets of representative pixels represent multiple possible combinations of N contiguous pixels in the Bresenham circle;

determining, for each set of representative pixels, a representative value as one of a maximum chromaticity value and a minimum chromaticity value from the set of representative pixels;

determining a score for each candidate feature point from the representative values for the plurality of sets of representative pixels associated with the candidate feature point; and selecting the feature points according to the determined scores for the plurality of candidate feature points.

2. The method of claim 1, wherein identifying a plurality of candidate feature points in each image comprises applying a features from accelerated segment test key point detection process to each image with a predetermined threshold value.

3. The method of claim 1, wherein
the sets of representative pixels represent each possible combination of N contiguous pixels in the Bresenham circle.

4. The method of claim 1, wherein determining a representative value comprises determining a maximum and a minimum value chromaticity value for each of the plurality of sets of representative pixels to form a set of maximum values and a set of minimum values.

5. The method of claim 4, wherein determining a score for each candidate feature point from the representative values comprises:
determining a minimum value from the set of maximum values;
determining a maximum value from the set of minimum values;
selecting a value one less than an absolute difference between a chromaticity value for the pixel associated with the candidate feature point and the determined minimum value as the score for the candidate feature point if the determined minimum value exceeds a chromaticity value associated with the candidate feature point; and
selecting a value one less than an absolute difference between a chromaticity value for the pixel associated with the candidate feature point and the determined maximum value as the score for the candidate feature point if the determined maximum value is less than the chromaticity value associated with the candidate feature point.

6. The method of claim 5, further comprising eliminating the candidate feature point if it falls between the determined minimum value and the determined maximum value.

7. The method of claim 1, wherein determining the representative value as one of a maximum chromaticity value and a minimum chromaticity value comprises determining the representative value as one of a maximum brightness value and a minimum brightness value within each set of representative pixels.

8. A system comprising:
a single instruction, multiple data (SIMD) processor; and
at least one non-transitory computer readable medium operatively connected to the SIMD processor and storing machine executable instructions configured to perform the method of claim 1 when executed by the SIMD processor.

9. The system of claim 8, the machine executable instructions being configured such that selecting a plurality of sets of representative pixels for each of the plurality of candidate feature points comprises loading respective arrays of pixels in respective regions of interest around a set of M candidate feature points into a first array, where M is an integer greater than one, and generating a second array, containing only pixels from the sets of representative pixels for the M candidate feature points, using a parallel SIMD look-up instruction.

10. The method of claim 1, wherein the radius of the Bresenham circle is three, and the group of pixels is a group of sixteen pixels.

11. The method of claim 10, wherein the sets of representative pixels represent each possible combination of N contiguous pixels in the Bresenham circle.

12. The system of claim 1, wherein the radius of the Bresenham circle is three, and the group of pixels is a group of sixteen pixels.

13. The system of claim 12, wherein the sets of representative pixels represent each possible combination of N contiguous pixels in the Bresenham circle.

14. A system for selecting feature points from a plurality of candidate feature points comprising:
a single instruction, multiple data (SIMD) processor; and
at least one non-transitory computer readable medium operatively connected to the SIMD processor and storing machine executable instructions comprising:
a pixel selection module configured to select, for each of a plurality of candidate feature points, a group of pixels around a pixel associated with the candidate feature point, the group of pixels forming a Bresenham circle having a radius of at least two, the pixel selection module being further configured to select a plurality of sets of representative pixels from the group of pixels for each of the plurality of candidate feature points, each of the sets of representative pixels being selected as a respective set of N contiguous pixels along the Bresenham circle, where N is an integer greater than two, such that the sets of representative pixels represent multiple possible combinations of N contiguous pixels in the Bresenham circle;
a score assignment module configured to determine one of a maximum chromaticity value and a minimum chromaticity value from each set of representative pixels as a representative value and determine a score for each candidate feature point from the representative values for the plurality of sets of representative pixels associated with the candidate feature point; and
a feature point selection module configured to select a set of P feature points, where P is a positive integer, from the plurality of candidate feature points according to the determined scores for the plurality of candidate feature points.

15. The system of claim 14, the machine executable instructions being configured such that the pixel selection module instructs the SIMD processor to load respective arrays of pixels in respective regions of interest around a set of M candidate feature points into a first array, where M is an integer greater than one, and generate a second array, containing only pixels from the sets of representative pixels for the M candidate feature points, using a parallel SIMD look-up instruction.

16. The system of claim 14, further comprising a candidate feature point selector configured to identify a plurality of candidate feature points from an image via a features from accelerated segment test key point detection process with a predetermined threshold value.

17. The system of claim 14, wherein the sets of representative pixels represent each possible combination of N contiguous pixels in the Bresenham circle.

18. The system of claim 14, wherein the score assignment module is configured to determine a representative value for each of the plurality of representative pixels by determining a maximum and a minimum value chromaticity value for each of the plurality of sets of representative pixels to form a set of maximum values and a set of minimum values.

19. The system of claim 18, the score assignment module being configured to determine a score for each candidate feature point from the representative values by determining a minimum value from the set of maximum values, determining a maximum value from the set of minimum values, selecting a value one less than an absolute difference between the determined minimum value and a chromaticity value associated with the candidate feature point as the score for the candidate feature point if the determined minimum value exceeds a chromaticity value associated with the candidate feature point, and selecting a value one less than an absolute difference between the determined maximum value as the score for the candidate feature point and the chromaticity value associated with the candidate feature point if the determined maximum value is less than the chromaticity value associated with the candidate feature point.

20. A system for selecting feature points from a plurality of candidate feature points comprising:
 a single instruction, multiple data (SIMD) processor; and
 at least one non-transitory computer readable medium operatively connected to the SIMD processor and storing machine executable instructions comprising:
 a pixel selection module configured to instruct the SIMD processor to load respective arrays of pixels in respective regions of interest around a set of M candidate feature points into a first array, where M is an integer greater than one, and generate a second array, containing only pixels from selected sets of representative pixels for the M candidate feature points, using a parallel SIMD look-up instruction;
 a score assignment module configured to determine, for each set of representative pixels, one of a maximum chromaticity value and a minimum chromaticity value from the set of representative pixels as a representative value and determine a score for each candidate feature point from the representative values for the plurality of sets of representative pixels associated with the candidate feature point; and
 a feature point selection module configured to select a set of P feature points, where P is a positive integer, from the plurality of candidate feature points according to the determined scores for the plurality of candidate feature points.

21. The system of claim 20, the pixel selection module being configured to select a group of sixteen pixels comprising a Bresenham circle having a radius of three and select a set of representative pixels for each of the group of sixteen pixels as a set of N contiguous pixels along the Bresenham circle including the pixel, where N is an integer greater than two, such that the plurality of sets of representative pixels represent each possible combination of N contiguous pixels in the Bresenham circle.

22. The system of claim 21, wherein the pixel selection model is configured to determine a representative value for each of the plurality of representative pixels by determining a maximum and a minimum value chromaticity value for each of the plurality of sets of representative pixels to form a set of maximum values and a set of minimum values.

23. The system of claim 22, the score assignment module being configured to determine a score for each candidate feature point from the representative values by determining a minimum value from the set of maximum values, determining a maximum value from the set of minimum values, selecting a value one less than an absolute difference between the determined minimum value and a chromaticity value associated with the candidate feature point as the score for the candidate feature point if the determined minimum value exceeds a chromaticity value associated with the candidate feature point, and selecting a value one less than an absolute difference between the determined maximum value and the chromaticity value associated with the candidate feature point as the score for the candidate feature point if the determined maximum value is less than the chromaticity value associated with the candidate feature point.

24. The system of claim 20, further comprising a candidate feature point selector configured to identify a plurality of candidate feature points from an image via a features from accelerated segment test key point detection process with a predetermined threshold value.

25. A method for selecting feature points within an image, comprising:
 applying a features from accelerated segment test key point detection process to each image with a predetermined threshold value to identify a plurality of candidate feature points in the image;
 selecting, for each of the plurality of candidate feature points, a plurality of sets of representative pixels;
 determining, for each set of representative pixels, a representative value as one of a maximum chromaticity value and a minimum chromaticity value from the set of representative pixels;
 determining a score for each candidate feature point from the representative values for the plurality of sets of representative pixels associated with the candidate feature point; and
 selecting the feature points according to the determined scores for the plurality of candidate feature points.

26. A system for selecting feature points from a plurality of candidate feature points comprising:
 a single instruction, multiple data (SIMD) processor; and
 at least one non-transitory computer readable medium operatively connected to the SIMD processor and storing machine executable instructions comprising:
 a candidate feature point selector configured to identify a plurality of candidate feature points from an image via a features from accelerated segment test key point detection process with a predetermined threshold value;
 a pixel selection module configured to select a plurality of sets of representative pixels for each of a plurality of candidate feature points;
 a score assignment module configured to determine one of a maximum chromaticity value and a minimum chromaticity value from each set of representative pixels as a representative value and determine a score for each candidate feature point from the representative values for the plurality of sets of representative pixels associated with the candidate feature point; and
 a feature point selection module configured to select a set of P feature points, where P is a positive integer, from the plurality of candidate feature points according to the determined scores for the plurality of candidate feature points.

* * * * *